US012797745B2

(12) United States Patent
Bean et al.

(10) Patent No.: US 12,797,745 B2
(45) Date of Patent: Nov. 17, 2026

(54) SYSTEMS AND METHODS FOR PROVIDING ASSISTANCE TO A USER DURING GAMEPLAY

(71) Applicant: Sony Interactive Entertainment Inc., Tokyo (JP)

(72) Inventors: Celeste Bean, San Francisco, CA (US); Bethany Tinklenberg, Oakland, CA (US); Kristie Ramirez, San Jose, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 207 days.

(21) Appl. No.: 18/449,872

(22) Filed: Aug. 15, 2023

(65) Prior Publication Data

US 2025/0058227 A1 Feb. 20, 2025

(51) Int. Cl.
*A63F 13/67* (2014.01)
*A63F 13/5375* (2014.01)

(52) U.S. Cl.
CPC .......... *A63F 13/67* (2014.09); *A63F 13/5375* (2014.09)

(58) Field of Classification Search
CPC .. A63F 13/422; A63F 13/798; A63F 13/5375; A63F 13/67
See application file for complete search history.

(56) References Cited

U.S. PATENT DOCUMENTS

2016/0375363 A1* 12/2016 Connor .................. A63F 13/00 463/23

FOREIGN PATENT DOCUMENTS

WO 2019231628 A1 12/2019

OTHER PUBLICATIONS

"International Search Report and Written Opinion", issued by the European Patent Office, as International Searching Authority for PCT/US2024/040379 on Nov. 6, 2024, 10 pages.
PCT/US2024/040379, "International Preliminary Report on Patentability", Feb. 26, 2026, 7 pages.

* cited by examiner

*Primary Examiner* — Thomas H Henry
(74) *Attorney, Agent, or Firm* — Kilpatrick Townsend & Stockton LLP

(57) ABSTRACT

Systems and methods for providing gameplay assistance are described. One of the methods includes monitoring gameplay of a user of a game. The monitoring occurs to identify interactive skills of gameplay by the user during a session of the game. The method further includes determining that the interactive skills of gameplay have fallen below a threshold level for progressing the game and initiating gameplay assistance responsive to the interactive skills falling below the threshold level. The gameplay assistance includes a blended bifurcation of user inputs to complete one or more interactive tasks of the game. The blended bifurcation of user inputs include an amount of assistance inputs that override selected ones of the user inputs. The amount of assistance inputs vary over time during the gameplay of the game to maintain the interactive skills of the gameplay above the threshold level of interactive skills for playing the game.

19 Claims, 7 Drawing Sheets

(User 1 Plays Game & Needs Help)

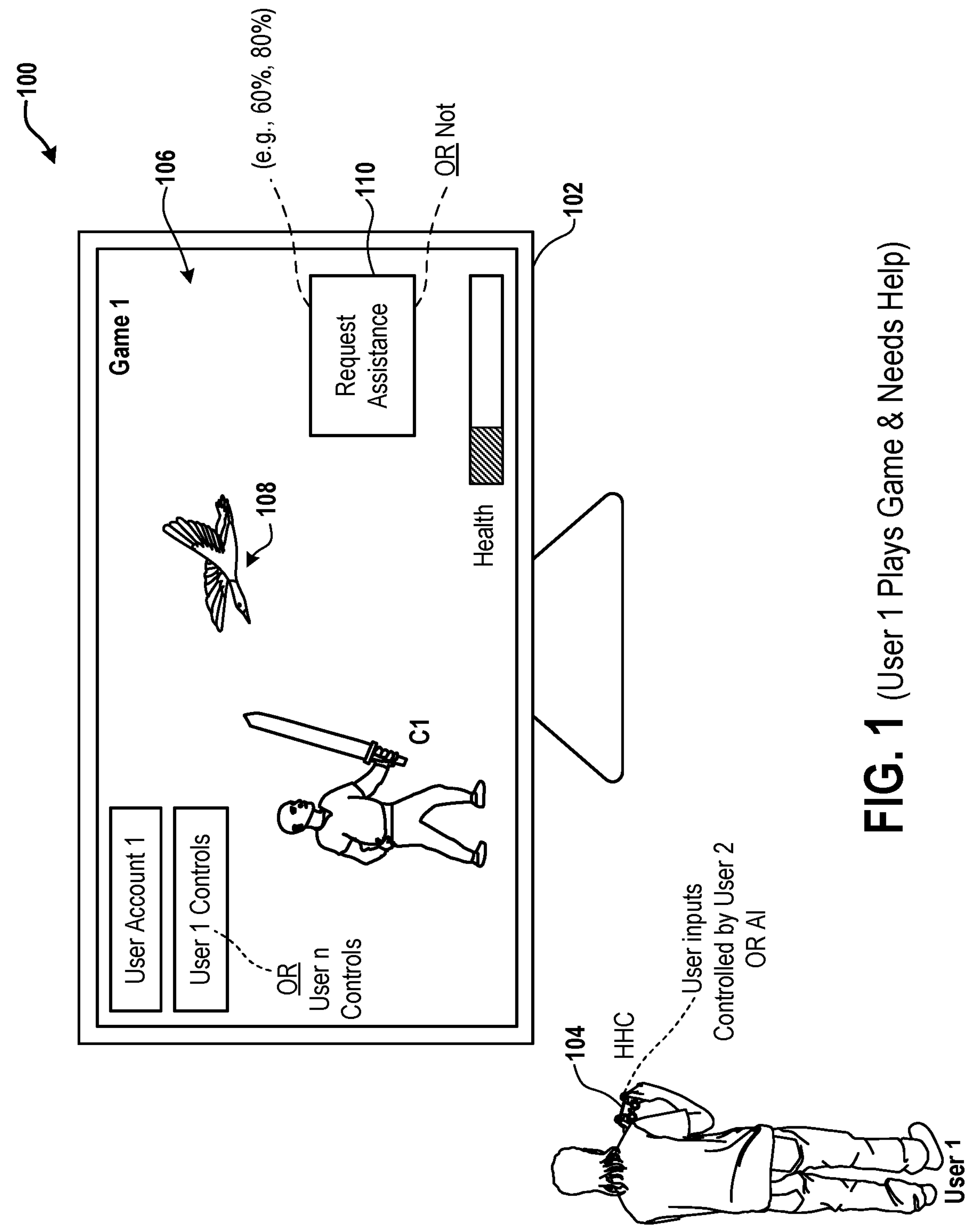
FIG. 1 (User 1 Plays Game & Needs Help)

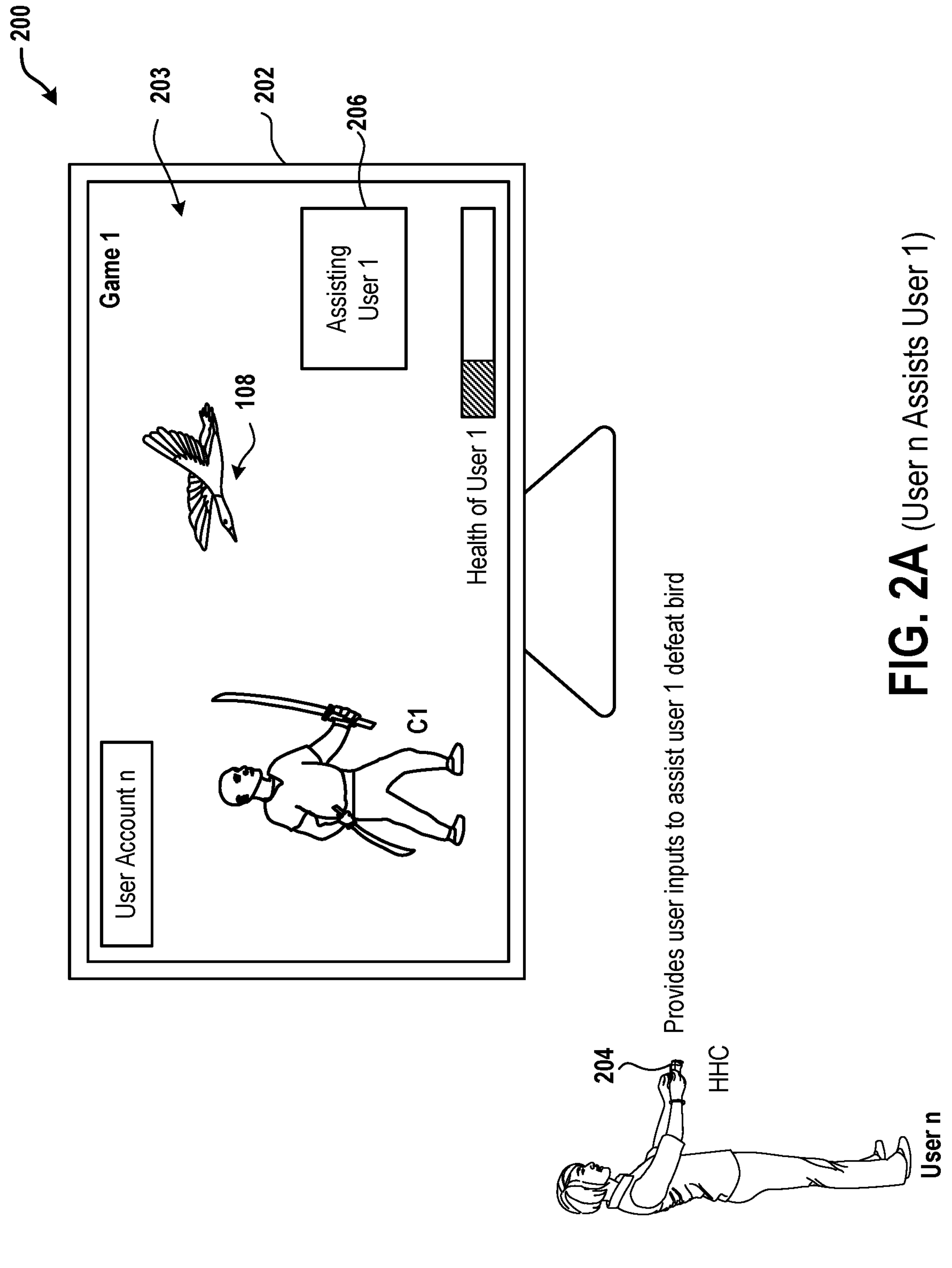
FIG. 2A (User n Assists User 1)

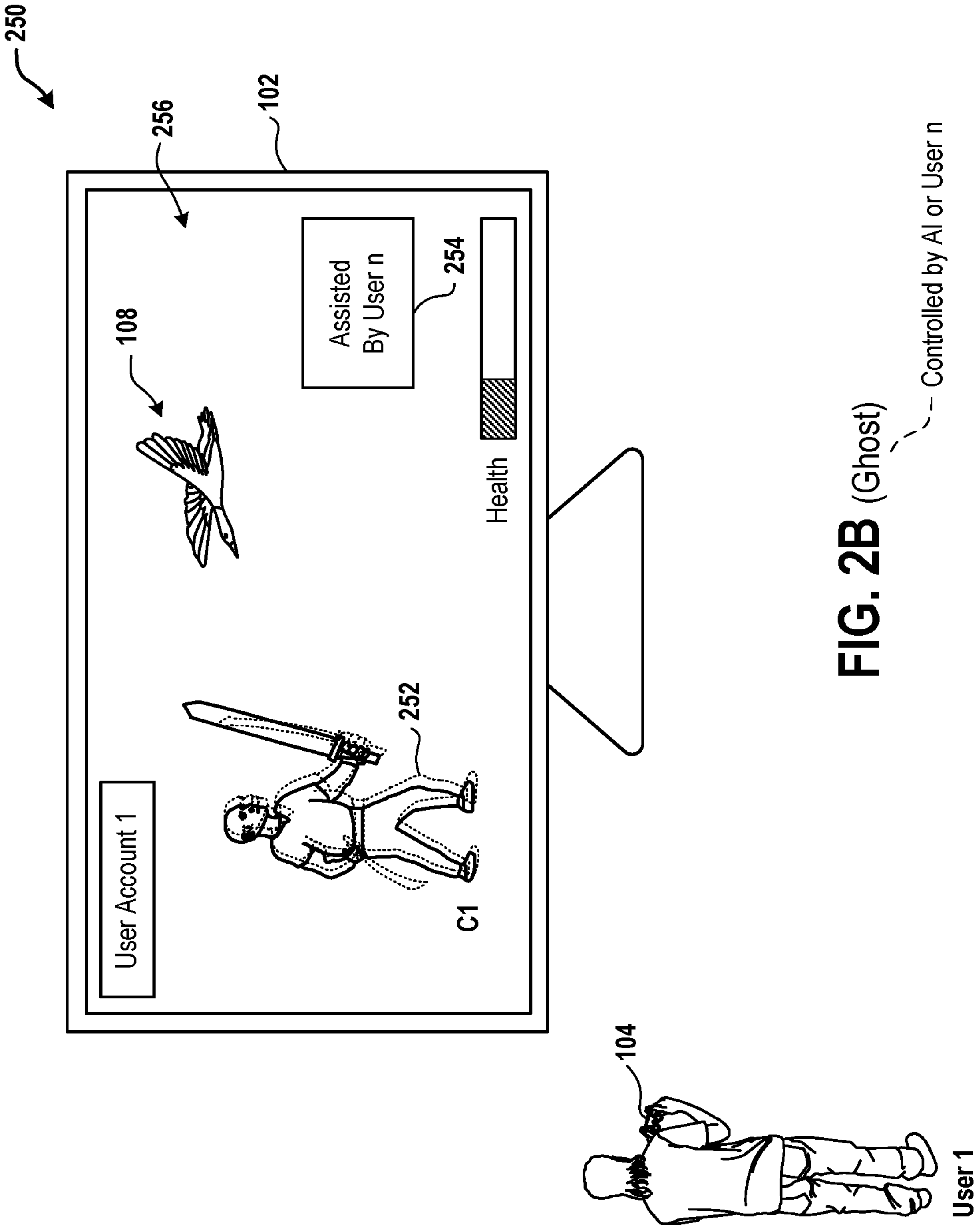
FIG. 2B (Ghost)

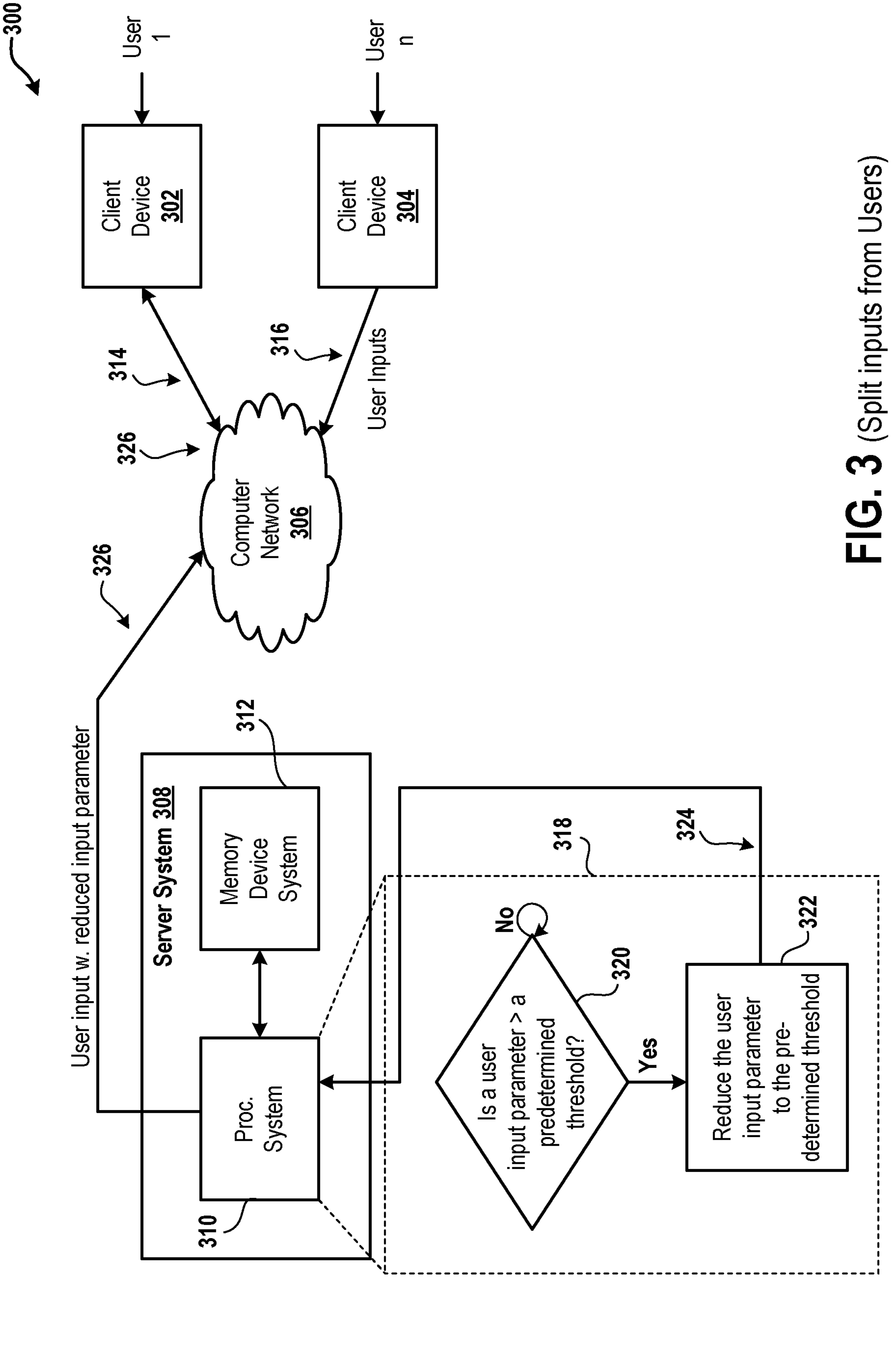
FIG. 3 (Split inputs from Users)

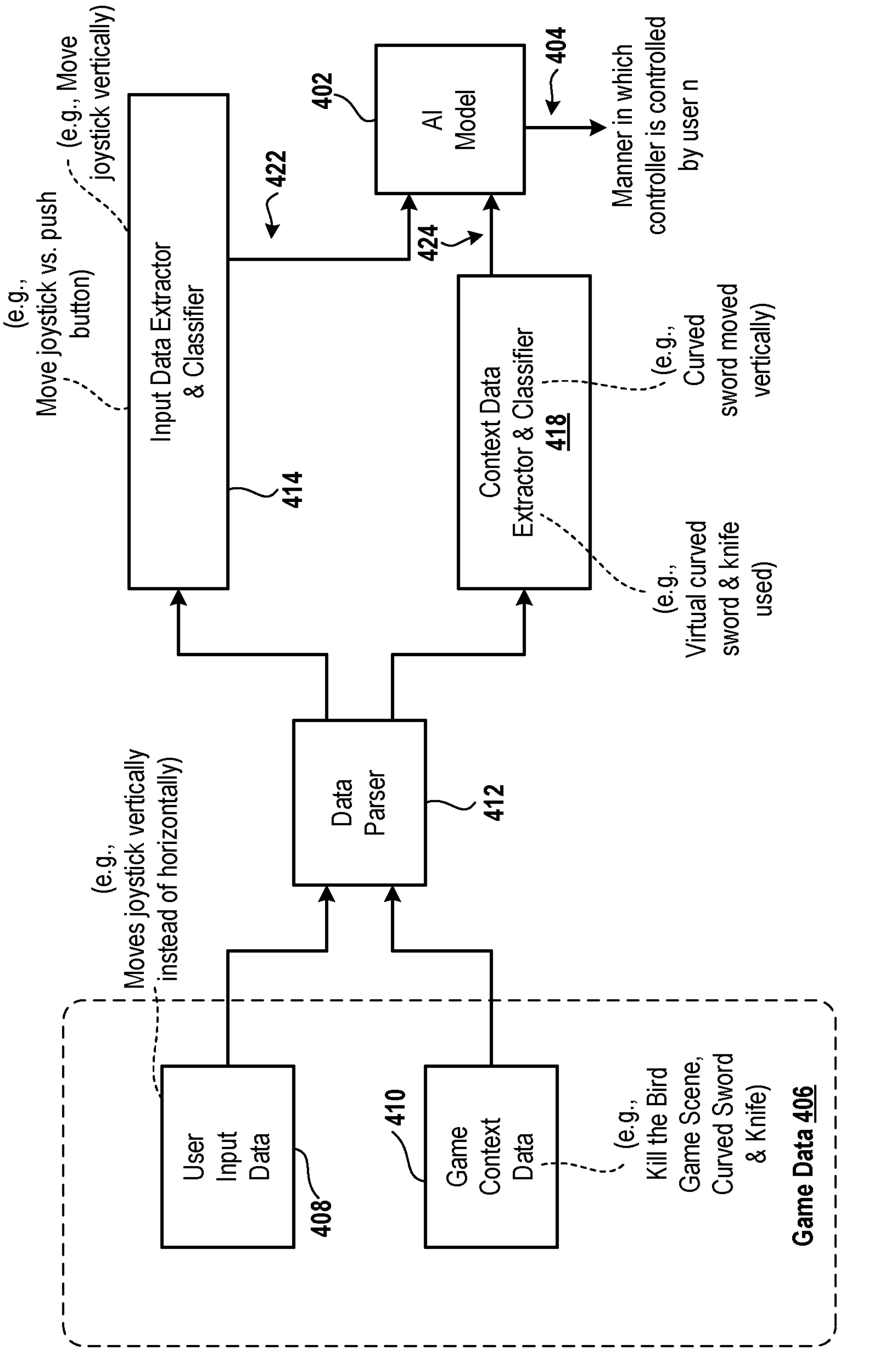
FIG. 4 (AI Model Trained)

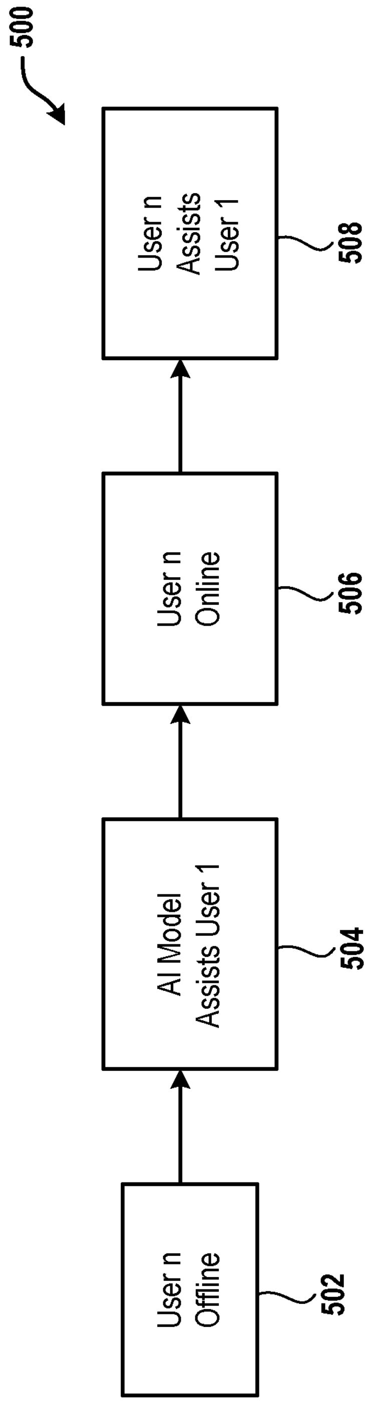
FIG. 5A (Intermittent Assistance by AI Model)
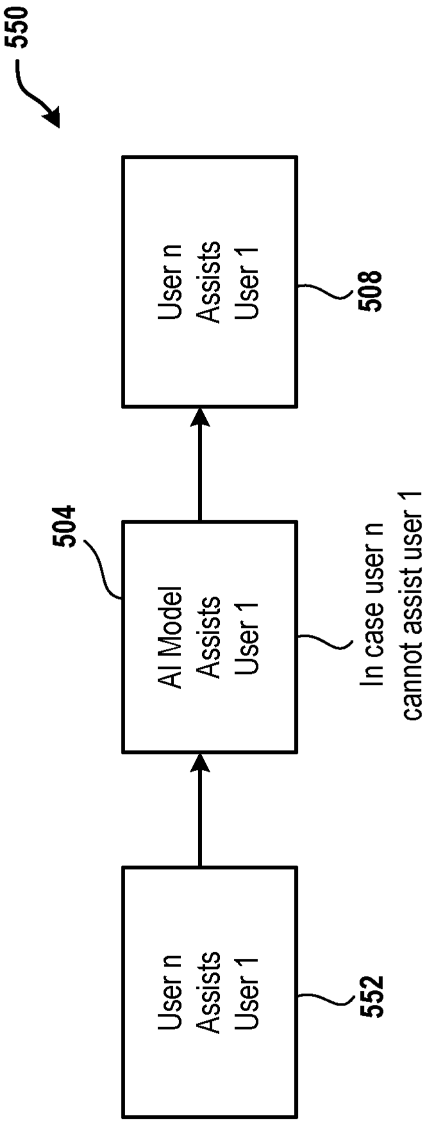
FIG. 5B (Intermittent Assistance by AI Model)

SYSTEMS AND METHODS FOR PROVIDING ASSISTANCE TO A USER DURING GAMEPLAY

FIELD

The present disclosure relates to systems and methods for providing assistance to a user during gameplay are described.

BACKGROUND

In a multiplayer game, many players access the Internet to join the game. The players take on different roles within the game. For example, one player controls a virtual beast and another player controls a virtual fighter. Each player can be assigned a goal to accomplish within the game.

It is in this context that embodiments of the invention arise.

SUMMARY

Embodiments of the present disclosure describe systems and methods for providing assistance to a user during gameplay.

In an embodiment, the methods described herein allow a first player to assist a second player, in real time to achieve a goal during a play of a game. The first player provides controller input for some controller inputs, for the second player, to assist the second player. In some cases, for hard input cases, to provide the assistance, actual inputs for the second player can be shown or actuated on a client device. The client device is operated by the second player. If the second player can make a certain input, the first player can make those inputs. This is a type of combiner, which allows control inputs from two or more players to be combined to provide combined input controls to the game.

In one embodiment, more or less control inputs received from a client device operated by the first player are allowed to be used, such as combined with, control inputs received from the client device operated by the second player. In some cases, the control inputs of the first player is geared to smooth in or out an amount of assistance to provide to the second player to achieve blended bifurcation.

In an embodiment, an artificial intelligence (AI) player, such as a virtual character or a ghost representation of a virtual character, controlled by an AI bot, instead of the first player, is injected into the game to help the second player at certain points in the game. For example, the AI bot provides the assistance to implement a model that determines how to play certain games. The assistance to the second player is injected intermittently, and the second player may not even know it happened. This allows the second player to play like a professional. The second player learns as he/she plays with assist.

In one embodiment, the assistance is received from a third player when the first player is not online.

In an embodiment, blended bifurcation is provided. For example, the methods provide an amount of control of user inputs each player gets. To illustrate, the second player can move a virtual character by 80 percent and the first player can move the virtual character by 20%. In the illustration, the percentages can change during a game session. As another illustration, weighting, which is an amount of control from each player, is provided to adjust the assistance from the first player.

In one embodiment, hinting, by using haptic or visual indicators, is provided before the blended bifurcation is initiated. The hinting indicates when control of user inputs passes from the second player to the first player to receive the assistance. For example, the systems described herein generate clues initially, and then transition to suggestions before the assistance is provided. The suggestions are softer at first, and then more aggressive, and then the assistance is provided for some time. When the second player selects one or more control buttons, such as a release button, the assistance stops.

In an embodiment, colored indicators, such as colored bars on a controller or on a display screen, are provided to show whether the first player or the second player is in control of a virtual character. Also, this helps the second player analyze whether the second player achieves a goal in the game by himself/herself or with assistance.

In an embodiment, windowing is provided. The windowing determines when to initiate the assistance and when to stop the assistance. For example, the start of the assistance is indicated using audio data that is output via a speaker. As another example, the assistance is initiated when an aggressive input to a controller is detected or a higher signal-to-noise ratio is detected or a player leaves a game too frequently.

In an embodiment, a player can select one or more control buttons on a controller to select modes of assistance. For example, the player can select the buttons to provide an indication of a period of time, such as 20 seconds, for which the assistance is desired.

In one embodiment, the assistance can be earned in the game. For example, a player can use a virtual token to receive the blended bifurcation.

The systems and methods, described herein, allow control inputs from the first and second players to be combined, with varying levels of input from the first player, depending on the situation. The systems can also be programmed to smoothly integrate the control inputs received from a controller operated by the first player, to ensure that the second player is not overwhelmed or frustrated by a level of assistance from the first player. The assistance is sometimes referred to herein as input and blended bifurcation, which occurs when the control inputs are split into two paths, one for the first player and one for the second player, and then combined.

Some advantages of the methods and systems, described herein, include providing a powerful tool for players who may be struggling with certain aspects of a game, allowing them to collaborate with other players or AI to overcome difficult sections and progress through the game with greater ease. The methods and systems provide for collaborative gameplay system, which allows the first player to assist the second player in real time. The first player can provide controller inputs for some control inputs for the second player, and in some cases, can even show or perform the control inputs for the second player. By assisting the second player, the systems and methods are useful in cases where the second player is having difficulty with a particular control input or section of the game.

Additional advantages of the herein described methods and systems include providing assistance to the second player. By receiving the assistance, the second player can still enjoy the game while at the same time obtaining help from the first player to achieve the goal within the game.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1 is a diagram of an embodiment of a system to illustrate a user requesting assistance during play of a game.

FIG. 2A is a diagram of an embodiment of a system to illustrate a provision of the assistance by another user.

FIG. 2B is a diagram of an embodiment of a system to illustrate an overlay displayed over a virtual character during the play of the game to provide the assistance to the other user.

FIG. 3 is a diagram of an embodiment of a system to illustrate limiting application of a user input parameter.

FIG. 4 is a diagram of an embodiment of a system to illustrate a method for training an artificial intelligence (AI) model to determine a manner in which the other user provides user inputs.

FIG. 5A is a diagram of an embodiment of a method to illustrate switching between providing assistance by the AI model and by the other user to the user during the play of the game.

FIG. 5B is a diagram of an embodiment of a method to illustrate that the AI model assists the user when the other user is incapable of assisting the user.

DETAILED DESCRIPTION

Figure 6:
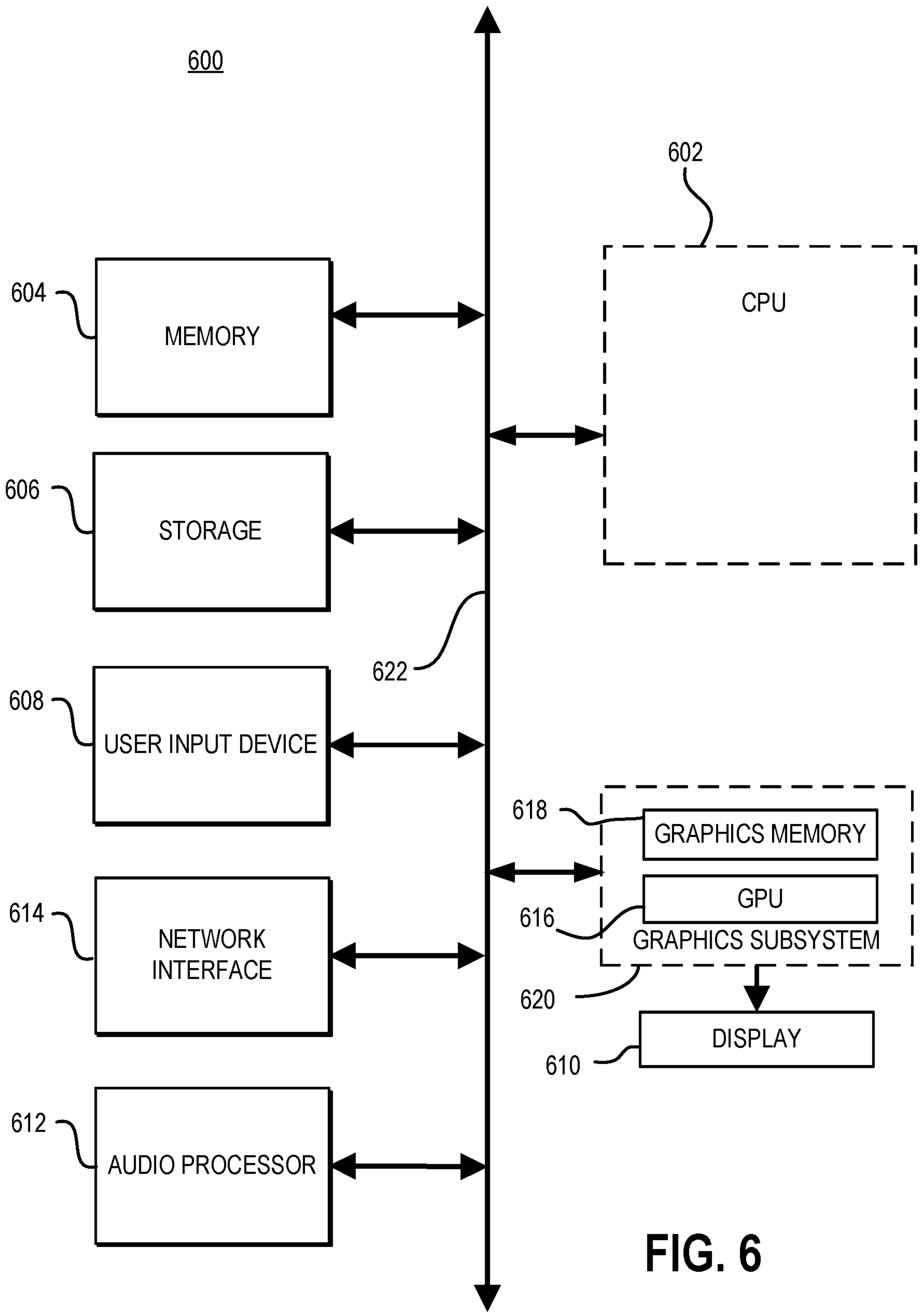
FIG. 6 illustrates components of an example device, such as a client device or a server system, described herein, that can be used to perform aspects of the various embodiments of the present disclosure.

Systems and methods for providing assistance to a user during gameplay are described. It should be noted that various embodiments of the present disclosure are practiced without some or all of these specific details. In other instances, well known process operations have not been described in detail in order not to unnecessarily obscure various embodiments of the present disclosure.

FIG. 1 is a diagram of an embodiment of a system 100 to illustrate a user 1 requesting assistance during play of a game. The system 100 includes a display device 102 and a hand-held controller (HHC) 104. Examples of a display device, as used herein, include a smart television, a television, a computer display, and a tablet. As an example, a hand-held controller includes one or more control buttons, such as one or more buttons or one or more joysticks or combination thereof.

The user 1 uses the HHC 104 to log into a user account 1, which is assigned to the user 1 by a server system. The server system is described below. Upon logging into the user account 1, the server system executes a game program of the game to display a virtual scene 106 of the game on the display device 102. The virtual scene 106 includes a virtual character C1 that is controlled by the user 1 via the HHC 104 and includes a virtual bird 108, which is attacking the virtual character C1. During the play of the game, the user 1 tries to control the virtual character C1 to defeat the virtual bird 108.

However, it is difficult for the user 1 to operate the HHC 104 to control the virtual character C1 to wield and use a virtual weapon, such as a long sword, to achieve victory over the virtual bird 108. When the game is being played, such as before or during a time period in which the virtual scene 106 is being displayed on the display device 102, or when the game is about to be played, the server system generates data for displaying a notification 110 and sends the data via a computer network to a client device, such as a combination of the HHC 104 and the display device 102, operated by the user 1. An example of the notification 110 includes a request for assistance during the play of the game. Another example of the notification 110 includes a request for a percentage of assistance, such as 60% or 80%, during the play of the game. To illustrate, the notification 110 includes a percentage field for receiving the percentage. The percentage of assistance is an example of a predetermined percentage. To illustrate, the percentage of assistance corresponds to, such as maps to or has a unique relationship to, an amount of time for which the assistance is provided to the user 1. The higher the percentage, the greater the amount of time for which the assistance is provided to the user 1. The user 1 uses the HHC 104 to provide the percentage. Other examples of the client device are provided below.

When the user 1 cannot defeat the virtual bird 108, the user 1 operates the HHC 104 to select the notification 110 and provides, within the percentage field, the percentage of assistance to be requested. When the notification 110 is selected, the client device operated by the user 1 generates a request for assistance during the play of the game. The client device operated by the user 1 sends the request for assistance including an indication of the selection of the notification 110 and the percentage via the computer network to the server system. Upon receiving the request for assistance including the indication and the percentage, the server system controls an amount of the assistance provided by another user n, such as a user 2, described below, to the user 1, wherein is an integer greater than one. For example, the server system determines that user inputs received from a client device controlled by the user n exceeds the percentage of assistance during a predetermined time period. To illustrate, the server system determines that a ratio of a number of the user inputs received from a client device operated by the user n to a sum of the number of user inputs and a number of user inputs received from the client device operated by the user 1 expressed as a percentage is greater than the percentage of assistance. In the example, the server system reduces the user inputs received from the client device controlled by the user n to achieve the predetermined percentage. As another illustration, the server system determines that the user inputs received from the client device operated by the user n can move the virtual character C1 by at most a predetermined percentage, such as 20%, in a predetermined direction. Upon determining that the user inputs received from the client device operated by the user n are capable of exceeding the movement of the virtual character C1 by greater than the predetermined percentage in the predetermined direction, the server system limits the movement of the virtual character C1 to be at the predetermined percentage.

In one embodiment, the notification 110 includes a user information field for receiving user information, such as a username or an e-mail identifier (ID), identifying a user account n assigned to the user n. The user account n is assigned to the user n by the server system. The user 1 operates the HHC 104 to provide the user information of the user n. Upon receiving the user information, the client device operated by the user 1 sends the user information via the computer network to the server system. The server system authenticates the user information and sends a request for assistance to the user account n. Upon receiving the request for assistance via the user account n, the user n operates an HHC to accept or deny the request. The HHC operated by the user n is an example of the client device operated by the user n. In response to receiving an indication of the denial of the request, the server system generates data for displaying a denial notification and sends the data to the client device operated by the user 1. Upon receiving the data for displaying the denial notification, the display device 102 displays the denial notification. On the other hand, in response to receiving an indication of the acceptance of the request, the server system generates data for displaying an acceptance notification and sends the data to the client device operated by the user 1. Upon receiving the data for displaying the acceptance notification, the display device 102 displays the acceptance notification.

In one embodiment, instead of the user 1 using the HHC 104 to generate the request for assistance, the server system generates the request when interactive skills of gameplay, such as a level of gameplay, by the user 1 falls below a predetermined threshold level. For example, the server system monitors, such as determines, whether the interactive skills of gameplay by the user 1 fall below the predetermined threshold level during a session of the game. To illustrate, the server system determines that the virtual character C1 controlled by the user 1 via the user account 1 and the HHC 104 cannot achieve a predetermined goal, such as, defeat the virtual bird 108 during the session. Defeating the virtual bird 108 is an example of a task predetermined by the server system. Upon determining that the virtual character C1 cannot achieve the predetermined goal, the server system determines that the interactive skills of gameplay by the user 1 fall below the predetermined threshold level. As another illustration, the server system determines that the virtual character C1 controlled by the user 1 cannot accumulate a number of virtual points greater than a preset threshold level before the virtual character's health reaches the low a predetermined health level. Upon determining that the virtual character C1 has not achieved the number of virtual points greater than the preset threshold level and the virtual character's health is below the predetermined health level, the server system determines that the interactive skills of gameplay by the user 1 fall below the predetermined threshold level. As yet another illustration, the server system determines that user account 1 has not reached a predetermined skill level based on gameplay of the game by the user 1 during one or more previous sessions of the game to determine that the interactive skills of gameplay by the user 1 fall below the predetermined threshold level.

When the interactive skills of gameplay by the user 1 fall below the predetermined threshold level, the game does not progress. For example, when the user 1 is unable to control the virtual character C1 to defeat the virtual bird 108, a next level of the game is not generated by the server system. In response to determining that interactive skills fall below the predetermined threshold level, the server system determines to provide assistance to the user 1 to complete one or more interactive tasks of the game. For example, the server system initiates, such as generates and sends, a request for assistance to the user account n or to an artificial intelligence (AI) model. Also, the server system includes the user information, such as a user identifier (ID) or a username, of the user 1 in the request for assistance. The user n accesses the user account n and reviews the request for assistance posted to the user account n. The user n decides whether to accept or deny the request for assistance to the user account 1.

In the embodiment, the server system executes the game program to achieve blended bifurcation between the user input data received from the client device operated by the user n via the user account n to control the virtual character C1 and user input data received from the client device operated by the user 1 via the user account 1 to control the virtual character C1. For example, the server system determines that the user input data is generated by the client device operated by the user n after the user input data is generated by the client device operated by the user 1 and controls operation of the virtual character C1 based on the user input data received from the client device operated by the user 1 first and controls operation of the virtual character C1 based on the user input data received from the client device operated by the user n second to achieve the blended bifurcation. As another example, the server system determines that the user input data is generated by the client device operated by the user n before the user input data is generated by the client device operated by the user 1 and controls operation of the virtual character C1 based on the user input data received from the client device operated by the user n first and controls operation of the virtual character C1 based on the user input data received from the client device operated by the user 1 second to achieve the blended bifurcation.

As still another example, the server system determines that first user input data is generated by the client device operated by the user n before or after second user input data is generated by the client device operated by the user 1, further determines that a portion of the first user input data and a portion of the second user input data achieve the same control of the virtual character C1, such as for example, make the virtual character C1 wield a sword, and determines to override the portion of the second user input data with the portion of the first user input data. To illustrate, the server system executes the game program to control the virtual character C1 to wield a curved sword instead of the long sword. The portion of the first user input data indicates that the virtual character C1 wield the curved sword and the portion of the second user input data indicates that the virtual character C1 wield the long sword. As another illustration, the server system replaces a first predetermined percentage of the second user input data within a second predetermined percentage of the first user input data. An example of the first predetermined percentage is a percentage of movement of a virtual object achieved by a percentage of operation of a control button of the HHC 104 and an example of the second predetermined percentage is a percentage of movement of the virtual object achieved by a percentage of operation of a control button of the HHC operated by the user n. To illustrate, instead of controlling the long sword to move in a horizontal direction, such as left to right or right to left, by 50% of a preset distance based on one or more user inputs received from the HHC 104, the server system controls the long sword to move in a vertical direction, such as from up to down or down to up, by 70% of the preset distance. The long sword is controlled to move in the vertical direction by 70% of the preset distance based on one or more user inputs received from the HHC controlled by the user n. Another example of the first predetermined percentage is a percentage of movement of a virtual object achieved by operating a percentage of control buttons of the HHC 104 and another example of the second predetermined percentage is a percentage of movement of the virtual object achieved by operating a percentage of control buttons of the HHC operated by the user n. To illustrate, instead of controlling the long sword to move in the horizontal direction by 40% of a preset distance based on one or more user inputs indicating selections of a first predetermined number of control buttons of the HHC 104, the server system controls the long sword to move in the vertical direction by 60% of the preset distance. The long sword is controlled to move the vertical direction by 60% of the preset distance based on one or more user inputs indicating selections of a second predetermined number of control buttons of the HHC controlled by the user n.

In the embodiment, when the AI model gets the request for assistance, the AI model accepts the request and provides the assistance to the user 1 to increase a level of the interactive skills to be above the predetermined threshold level. For example, the AI model generates user input data to provide the assistance to the user 1 via the user account 1. The server system executes the game program and the AI model to perform blended bifurcation between the user input data received from the AI model and user input data received from the HHC 104 operated by the user 1 to control the virtual character C1. For example, the server system determines that the user input data is generated by the AI model after the user input data is generated by the HHC 104 and controls operation of the virtual character C1 based on the user input data received from the HHC 104 first and controls operation of the virtual character C1 based on the user input data received from the AI model second to achieve the blended bifurcation. As another example, the server system determines that the user input data is generated by the AI model before the user input data is generated by the HHC 104 and controls operation of the virtual character C1 based on the user input data received from the AI model first and controls operation of the virtual character C1 based on the user input data received from the HHC 104 second to achieve the blended bifurcation. As still another example, the server system determines that first user input data is generated by the AI model before or after second user input data is generated by the HHC 104, further determines that a portion of the first user input data and a portion of the second user input data achieve the same control of the virtual character C1, such as for example, make the virtual character C1 wield a sword, and determines to override the portion of the second user input data with the portion of the first user input data. To illustrate, the server system executes the game program and the AI model to control the virtual character C1 to wield the curved sword instead of the long sword. The portion of the first user input data indicates that the virtual character C1 wield the curved sword and the portion of the second user input data indicates that the virtual character C1 wield the long sword.

In the embodiment, the AI model generates the user input data until the interactive skills of gameplay by the user 1 are above the predetermined threshold level. Once the server system executes the game program to determine that the interactive skills of gameplay by the user 1 are above the predetermined threshold level, the game program requests the AI model to stop generating the user input data to stop providing the assistance to the user 1. After the AI model stops providing the assistance to the user 1 via the user account 1, the game program determines whether the interactive skills of gameplay by the user 1 during the session of the game or another session of the game falls below the predetermined threshold level. Upon determining that the interactive skills of gameplay by the user 1 during the session or another session falls below the predetermined threshold level, the game program requests the AI model to provide assistance again. In this manner, an amount of user input data, such as an amount of user inputs, provided to assist the user 1 to increase a level of the interactive skills of gameplay by the user 1 to be above the predetermined threshold level vary over time to maintain the interactive skills of gameplay to be above the predetermined threshold level.

In an embodiment, a level of assistance that is provided by the AI model to the user 1 via the user account 1 varies during one or more game sessions to achieve the predetermined goal. For example, after providing the assistance, the server system determines whether the predetermined goal will be achieved within a predetermined time period. For example, the server system executes the game program or AI model to determine whether the predetermined goal will be achieved within a predetermined time period. Upon determining that the predetermined goal will not be achieved within the predetermined time period, the server system determines to apply the game program or the AI model to increase the level of assistance. For example, the server system sends a request to the AI model to assist the user 1 to control the virtual character C1 for 60% of a predetermined time interval instead of 50% of the predetermined time interval. On the other end, upon determining that the predetermined goal will be achieved within the predetermined time period, the server system maintains the level of assistance that is provided by the AI model.

In one embodiment, instead of the user 1 using the HHC 104 to generate the request for assistance, the server system generates the request in response to receiving one or more predetermined signals from the client device operated by the user 1. An example of the one or more predetermined signals is a signal indicating one or more aggressive operations, such as movements or selections, of one or more control buttons of the HHC 104. To illustrate, during the play of the game, when the virtual scene 106 is displayed, the user 1 uses the HHC 104 to operate one or more control buttons of the HHC 104 in an aggressive manner to generate user inputs, such as sensor data. The user inputs are an example of the one or more predetermined signals. The sensor data is output from one or more sensor devices of the HHC 104. The user inputs are received by the server system via the computer network and analyzed by the server system to determine that the user inputs indicating the aggressive operations. For example, the server system determines, from the user inputs, that the HHC 104 is shaken at a frequency greater than a predetermined frequency, or rotated at a frequency greater than the preset frequency, or the one or more control buttons are operated at a frequency greater than a predetermined frequency, or the one or more control buttons are operated at an intensity greater than a predetermined intensity, or a combination thereof to determine that the HHC 104 is operated in the aggressive manner. As another illustration, during the play of the game, the user 1 operates the HHC 104 to exit a predetermined number of sessions of the game at a frequency to generate user inputs. The user inputs, which are an example of the one or more predetermined signals, are received by the server system and analyzed to determine that the frequency at which the user 1 exits the predetermined number of sessions of the game is greater than a predetermined frequency. As yet another illustration, the server system determines that the user 1 operates the HHC 104 generate user inputs during multiple game sessions. The user inputs indicate that the user 1 exits the game sessions for a number of times greater than a predetermined number of times within a preset time period. In the illustration, the user inputs are an example of the one or more predetermined signals. Further, in the illustration, upon determining that the user 1 exits the game sessions for the number of times greater than the predetermined number, the server system generates the request for assistance during a next game session accessed by the user 1 via the user account 1.

In an embodiment, before providing the assistance, the server system determines whether the user account 1 has a number of virtual rewards, such as virtual tokens or virtual points or a combination thereof, that are greater than a predetermined number. In response to determining that the user account 1 has the number of virtual rewards greater than the predetermined number, the server system determines to provide assistance to the user 1. On the other hand, in response to determining that the user account 1 has the number of virtual rewards less than the predetermined number, the server system determines to not provide the assistance to the user 1.

In an embodiment, user input data that is received from the AI model or the server system or the client device operated by the user n to provide assistance to the user 1 via the user account 1 is sometimes referred to herein as assistance inputs or input controls or control inputs or user inputs.

In one embodiment, before providing assistance to the user 1, such as before generating the data for displaying the notification 110, upon determining that the interactive skills of gameplay are below the predetermined threshold level, the server system progressively helps the user 1 to increase the interactive skills of gameplay. For example, the server system generates data for displaying clues, such as hints. Examples of the clues include data indicating to wield a different virtual weapon instead of the long sword or swing the long sword in a different direction instead of the horizontal direction. The server system sends the data for displaying clues via the computer network to the client device operated by the user 1. Upon receiving the data for displaying clues, the display device 102 displays the clues. Moreover, in the example, once the clues are displayed, the server system determines that the interactive skills of gameplay are below the predetermined threshold level and upon determining so, the server system generates data for displaying suggestions that are softer to start, and then transition to generating data for displaying suggestions that are aggressive. Examples of the suggestions that are softer include wielding the curved sword and examples of the suggestions that are aggressive include controlling the virtual character C1 to swing the curved sword in the vertical direction. The server system sends the data for displaying the softer suggestions via the computer network to the client device operated by the user. Upon receiving the data for displaying the softer suggestions, the display device 102 displays the softer suggestions. Once the software suggestions are displayed, the server system determines that the interactive skills of gameplay are below the predetermined threshold level and upon determining so, the server system generates data for displaying the aggressive suggestions. The server system sends the data for displaying the aggressive suggestions via the computer network to the client device operated by the user. Upon receiving the data for displaying the aggressive suggestions, the display device 102 displays the aggressive suggestions. Once the aggressive suggestions are displayed, the server system determines that the interactive skills of gameplay are below the predetermined threshold level and upon determining so, the server system provides the assistance to the user 1.

In the embodiment, once the assistance is provided to the user 1, the user 1 decides whether to continue to receive the assistance or to stop receiving the assistance. For example, the user 1 selects one or more control buttons, such as a release button or a cancel button, on the HHC 104 to stop receiving the assistance. To illustrate, upon listening to the sound or receiving the haptic feedback indicating the initiation of the provision of the assistance, the user 1 selects the one or more control buttons to cancel the reception of the assistance. Upon receiving an indication of the selection of the one or more control buttons to stop receiving the assistance from the client device operated by the user 1, the server system does not provide the blended bifurcation. To illustrate, the game program requests the AI model to stop providing the user input data. As another illustration, the game program ignores the user inputs received from the client device operated by the user n and generates data for displaying a notification to the user n to stop providing the user inputs to control the virtual character C1. The server system sends the data for displaying the notification to stop providing the user inputs via the computer network to the client device operated by the user n. Upon receiving the data for displaying the notification to stop providing the user inputs, the client device operated by the user n displays the notification and the user n stops using the client device operated by the user n to stop generating the user inputs for controlling the virtual character C1.

In one embodiment, during a time period in which assistance is provided to the user 1 by either the AI model or the user n, the server system generates data for displaying a color and sends the data via the computer network to the client device operated by the user n. For example, the HHC 104 receives the data from the server system. A processor of the HHC 104 controls a light device, such as a light emitting diode, of the HHC 104 to display the color on the HHC 104 to inform the user 1 that the assistance is being provided. As another example, the display device 102 receives the data from the server system. A graphical processing unit (GPU) of the display device 102 displays the color on a display screen of the display device 102 to inform the user 1 that the assistance is being provided.

In one embodiment, the assistance is provided in the form of indicators, such as colored bars or color highlights, identifying the control buttons of the HHC 104 that are to be indicated as operated by the AI model to assist the user 1 or that are operated by the user n to assist the user 1, and identifying the control buttons operated by the user 1. For example, upon receiving the user input data from the AI model or the client device operated by the user n, the server system sends the user input data via the computer network to the client device operated by the user 1 with an instruction to display the user input data in the form of control button selections. In response to receiving the user input data, a processor of the client device operated by the user 1 controls one or more control buttons of the client device to output the control button selections. To illustrate, the processor of the HHC 104 controls lights on control buttons of the HHC 104 to indicate to the user 1 which of the control buttons have been selected by the user n or the AI model to receive the assistance. In the illustration, some of the control buttons that have been selected by the user n or the AI model to provide the assistance to the user 1 are highlighted using a first color and some of the control buttons that have been selected by the user 1 are highlighted using a second color. As another illustration, the GPU of the display device 102 generates one or more images of the HHC 104 or of the control buttons of the HHC 104 or other types of display buttons to identify to the user 1 which of the control buttons has been selected by the AI model or the user n to receive the assistance and which of the control buttons has been selected by the user 1. Moreover, in the example, in response to receiving the user input data from the AI model or the client device operated by the user n, the server system applies the blended bifurcation to modify state data of the game to control the virtual character C1 as wielding the curved sword and a knife and moving the curved sword in the vertical direction to defeat the virtual bird 108. The server system sends the state data simultaneously with the user input data via the computer network to the client device operated by the user 1 to assist the user 1. The user input data, as described above, is used to output the control button selections.

In one embodiment, the assistance is provided in the form of indicators identifying the control buttons of the HHC 104 that are to be operated by the user 1 to receive the assistance from the AI model or the user n. For example, upon receiving the user input data from the AI model or the client device operated by the user n, the server system sends the user input data via the computer network to the client device operated by the user 1 with an instruction to display the user input data in the form of control button selections. In response to receiving the user input data, a processor of the client device operated by the user 1 controls one or more control buttons of the client device operated by the user 1 to output the control button selections. To illustrate, the processor of the HHC 104 controls light emitters, such as light emitting diodes, on control buttons of the HHC 104 to indicate to the user 1 which of the control buttons to select based on the user input data received as assistance from the user n or the AI model. As another illustration, the GPU of the display device 102 generates one or more images of the control buttons of the HHC 104 or of other types of display buttons to identify to the user 1 which of the control buttons to select to receive the assistance. Moreover, in the example, in response to receiving the user input data from the AI model or the client device operated by the user n, the server system does not apply the blended bifurcation to modify state data of the game to control the virtual character C1 as wielding the curved sword and a knife and moving the curved sword in the vertical direction to defeat the virtual bird 108. Rather, in the example, once the control buttons are selected by the user 1 on the client device operated by the user 1, user input data is generated by the client device operated by the user 1 and is received via the computer network by the server system. Based on the user input data received from the client device operated by the user 1, the server system applies the blended bifurcation to modify state data of the game to control the virtual character C1 as wielding the curved sword and the knife and moving the curved sword in the vertical direction to defeat the virtual bird 108.

In an embodiment, the predetermined threshold level is set by the user 1 via the user account 1. For example, the user 1 operates one or more control buttons of the HHC 104 to generate an indication of the predetermined threshold level. An example of the predetermined threshold level is a virtual death of the virtual character C1 for a predetermined number of times or an occurrence of a game session in which the virtual character C1 is trying to defeat another virtual character that is controlled by a player having a higher skill level than the user 1 or an occurrence of a game session in which the virtual character C1 is competing with another virtual character that is controlled via a preselected user account. The user 1 uses the HHC 104 to identify the preselected user account. To illustrate, the user 1 uses the HHC 104 to select the user information of the preselected user account.

In one embodiment, when assistance to the user 1 by the AI model or the user n is initiated, such as begins, the server system generates data for informing the user 1 regarding the initiation of the assistance. The data for informing the user 1 of the initiation of the assistance is an example of an interactive cue. Examples of the data for informing the user 1 include audio data, image data, and haptic feedback data. To illustrate, the server system generates the audio data and sends the audio data via the computer network to the client device operated by the user 1. A processor of the client device operated by the user 1 outputs the audio data as sound via speakers of the client device and the sound is output to inform the user 1 of the initiation of the assistance. As another illustration, the server system generates the haptic feedback data and sends the haptic feedback data via the computer network to the client device operated by the user 1. A processor of the client device operated by the user 1 outputs the haptic feedback data as vibrations or other movement of the client device, such as the HHC 104, operated by the user 1 to inform the user 1 of the initiation of the assistance.

In one embodiment, a session of the game begins when a user logs into the user account assigned to the user by the server system and accesses the game program from the server system. The session ends when it is determined by the server system that a predefined point is reached in the game. For example, the session ends when the user logs out of the user account or the game ends or the user reaches a predefined level in the game. To illustrate, the predefined level is reached when the predetermined goal is achieved or a match is completed within the game.

In an embodiment, instead of a display device, used herein, a head mounted display (HMD) is used.

FIG. 2A is a diagram of an embodiment of a system 200 to illustrate a provision of the assistance by the user n. The system 200 includes a display device 202 and an HHC 204, which is operated by the user n. The server system sends the request for assistance received from the user account 1 to the user account n. The user n logs into the user account n to access the game. When the user n logs into the user account n, the server system sends data for displaying the request for assistance via the computer network to the client device, including a combination of the display device 202 and the HHC 204, operated by the user n. Upon receiving the data for displaying the request for assistance, the display device 202 displays the request for assistance. The user n operates the HHC 204 to accept or deny the request for assistance.

The user n selects or moves one or more control buttons of the HHC 204 to operate the HHC 204. When the control buttons of the HHC 204 are operated, user input data, such as one or more user inputs, is generated by the client device operated by the user n. As an example, the user input data generated from the client device operated by the user n include signals indicating which of the control buttons of the HHC 204 are operated by the user n to play the game or during the play of the game or to end the game or a combination thereof.

In response to receiving an indication of the acceptance of the request for assistance, the client device operated by the user n sends the indication via the computer network to the server system. Upon receiving the indication of the acceptance of the request, the server system sends data for displaying the virtual scene 106 (FIG. 1) to the client device operated by the user n. As an example, the virtual scene 106 is displayed on the display device 202 during the same session of the game in which the virtual scene 106 is displayed on the display device 102 (FIG. 1). The display device 202 displays the virtual scene 106 upon receiving the data for the display of the virtual scene 106.

The user n operates the HHC 204 and the operation generates user inputs to allow the user n to play the game. For example, the user n uses the HHC 204 to operate, such as move or select, one or more control buttons to defeat the virtual bird 108 to assist the user 1. The operation of the one or more control buttons of the HHC 204 by the user n is an example of the user inputs associated with the HHC 204 or the client device operated by the user n. As an example, when the indication of the acceptance of the request is received from the user account n, the server system controls the virtual character C1 based on operation of the HHC 204 instead of the HHC 104 (FIG. 1). To illustrate, any operation of the HHC 104 is overridden by the server system in controlling movement of the virtual character C1 with operation of the HHC 204. To further illustrate, during a time period in which the user n operates the HHC 204 to control the virtual character C1, the server system does not use control the virtual character C1 based on operation of the HHC 104 by the user 1. As another example, the user n operates the HHC 204 to select different virtual weapons, such as the knife and the curved sword, than a virtual weapon, such as the long sword, used by the user 1. The different virtual weapons are used to defeat the virtual bird 108. The client device operated by the user n sends the selection of the different virtual weapons via the computer network to the server system. Upon receiving an indication of the selection of the different virtual weapons, the server system server system modifies the virtual scene 106 to generate data for displaying a virtual scene 203, and sends the data via the computer network to the client device operated by the user n.

Also, when the acceptance of the request for assistance is received from the client device operated by the user via the computer network and the user account n, the server system generates data for displaying a notification 206. The data for displaying the notification 206 is sent via the computer network to the client device operated by the user n. The display device 202 displays the notification 206 within the virtual scene 203 in response to receiving the data for displaying the notification 206.

In one embodiment, instead of the user n assisting the user 1 to defeat the virtual bird 108, the AI model, such as an AI bot, controls the virtual character C1 or any virtual weapons used by the virtual character C1 or a combination thereof to defeat the virtual bird 108. When movement of the virtual character C1 or the virtual weapons used by the virtual character C1 or a combination thereof is controlled by the AI model, the virtual character C1 is sometimes referred to herein as a nonplayer character (NPC).

FIG. 2B is a diagram of an embodiment of a system 250 to illustrate an overlay 252, such as an imprint or a ghost image, displayed over the virtual character C1 during the play of the game. The system 250 includes the display device 102 and the HHC 104. When the user n is assisting the user 1 to defeat the virtual bird 108 during the play of the game, the server system generates data for displaying the overlay 252. Also, during a time period in which the user n is assisting the user 1 to defeat the virtual bird 108, the server system generates data for displaying a notification 254. The notification 254 indicates that the user n is currently assisting the user 1 to defeat the virtual bird 108. The data for displaying the notification 254 is sent via the computer network to the client device operated by the user 1. The display device 102, upon receiving the data for displaying the notification 254, displays the notification 254.

The overlay 252 is the virtual character C1 as controlled by the user n via the HHC 204 (FIG. 2A). For example, the overlay 252 is the virtual character C1 that holds the different virtual weapons. The server system sends the data for displaying the overlay 252 via the computer network to the client device operated by the user 1. In response to receiving the data for displaying the overlay 252, the display device 102 displays the overlay 252. When the user n uses the HHC 204 to generate user inputs to control the virtual character C1 in a manner, the overlay 252 is controlled in the same manner. For example, the virtual character C1, controlled by the user 1, does not move in a virtual scene 256 displayed on the display device 102. Rather, the overlay 252, which represents the virtual character C1 and is controlled by the user n via the HHC 204 moves in the virtual scene 256. The virtual scene 256 is the same as the virtual scene 106 (FIG. 1A) except that the virtual scene 256 includes the overlay 252.

In one embodiment, the overlay 252 is not controlled by the user n via the HHC 204 but is controlled by the AI model. For example, the AI model is trained based on game play of the game by the user n and controls the overlay 252 based on the training. When the overlay 252 is controlled by the AI model, the overlay 252 is sometimes referred to herein as an NPC.

FIG. 3 is a diagram of an embodiment of a system 300 to illustrate limiting application of a user input parameter. The system 300 includes a client device 302, another client device 304, a computer network 306, and a server system 308. An example of a client device, as used herein, includes a combination of a display device, a game console, and a hand-held controller. Another example of a client device includes a desktop computer or a laptop computer or a smart phone. Yet another example of a client device includes a head-mounted display and a hand-held controller. As another example, a combination of the hand-held controller 104 and the display device 102 (FIG. 1) is an example of the client device 302 and a combination of the hand-held controller 204 and the display device 202 (FIG. 2A) is an example of the client device 304. The client device 302 is an example of the client device operated by the user 1 and the client device 304 is an example of the client device operated by the user n. As an example, the computer network 306 is a local area network (LAN) or a wide area network (WAN), such as the Internet, or a combination thereof.

The server system 308 includes a processor system 310 and a memory device system 312. As an example, the processor system 310 includes one or more processors and the memory device system 312 includes one or more memory devices. Examples of a processor, as used herein, include an application specific integrated circuit (ASIC), a programmable logic device (PLD), and a central processing unit (CPU). The processor system 310 is sometimes referred to herein as a combiner when it combines user inputs from multiple client devices operated by multiple users to determine a state of the game.

The processor system 310 is coupled to the memory device system 312 and to the computer network 306. The computer network 306 is coupled to the client devices 302 and 304.

The processor system 310 receives user inputs 314 from the client device 302 via the user account 1 and the computer network 306 and receives user inputs 316 via the computer network 306 and the user account n from the client device 304. As an example, the user inputs 316 are received after the user n accepts, via the user account n, the request for assistance received from the user account 1. In the example, one of the user inputs 314 includes the request for assistance and is generated when the user 1 selects one or more control buttons on the hand-held controller 104 (FIG. 1). The processor system 310 receives the user inputs 314 and 316 and applies a method 318 to the user inputs 314 and 316.

In the method 318, the processor system 310 determines, in an operation 320 of the method 318, whether the user input parameter, which is a parameter associated with the user inputs 316, exceeds a predetermined threshold. For example, the processor system 310 determines that the user inputs 316 are received in response to the request for assistance and further determines whether a number of the user inputs 316 received within a predetermined time period is greater than the predetermined threshold. Upon determining that the user inputs 316 is greater than the predetermined threshold, the processor system 310 reduces, in an operation 322 of the method 318, a number of the user inputs 316 to match the predetermined threshold. This reduces chances that the user 1 is overwhelmed with the user inputs 316. As another example, the processor system 310 determines whether a percentage of the user inputs 316 received within the predetermined time period exceeds the predetermined threshold. To illustrate, the processor system 310 determines the percentage as a ratio of a number of the user inputs 316 to a sum of a portion of the user inputs 314 and the number of the user inputs 316 received within the predetermined time period. In the illustration, the portion of the user inputs 314 is received after one or more of the user inputs 314 indicating the request for assistance is received. Upon determining that the percentage exceeds the predetermined threshold, the processor system 310 executes the operation 322. The number of user inputs 316 is reduced until the percentage of the user inputs 316 matches the predetermined threshold. When the number of user inputs 316 is reduced, reduced user inputs 324 are generated.

An example of the user input parameter includes the number of the user inputs 316 received within the predetermined time period. Another example of the user input parameter includes the percentage of the user inputs 316 received within the predetermined time period.

After executing the operation 322, the processor system 310 aggregates the user inputs 314 with the reduced user inputs 324 to process the user inputs 314 and 324 to apply to the game program. It should be noted that all of the user inputs 316 are not applied to the game program. For example, when the user inputs 316 indicate that the virtual character C1 is to use the curved sword and the knife to defeat the virtual bird 108 (FIG. 2A), the reduced user inputs 324 indicate that the virtual character C1 is to use the curved sword and do not indicate that the virtual character C1 is to use the knife.

The user inputs 314 and 324 are processed by the processor system 310 to generate state data regarding the game. For example, the user inputs 324 indicate that the virtual character C1 is to wield the curved sword and move the curved sword vertically, such as up and down, to defeat the virtual bird 108 (FIG. 1). The processor system 310 generates data for displaying the curved sword and further generates movement data, such as position and orientation data, for moving the curved sword vertically. To illustrate, the processor system 310 generates data for displaying the overlay 252 (FIG. 2B). Examples of the state data include the data for displaying the curved sword, the movement data for displaying the movement of the curved sword, and the data for displaying the overlay 252.

The processor system 310 generates a feedback signal 326 including multimedia frames, such as image and audio frames, having the state data and sends the feedback signal 326 via the computer network 306 to the client device 302. Upon receiving the feedback signal 326, the client device 302 operates to provide feedback to the user 1. For example, a processor of the client device 302 receives the state data and displays the overlay 252 on the display device 102 (FIG. 2B). As another example, the processor of the client device 302 receives the state data and displays the curved sword being held by the virtual character C1 instead of the long sword and displays the vertical movement of the curved sword.

It should be noted that one or more control buttons of the client device 302, such as the HHC 104, are operated, such as moved or pressed or selected, by the user 1 to generate the user inputs 314 from the client device 302. As an example, the user inputs 314 generated from the client device 302 operated by the user 1 include signals indicating which of the control buttons are operated by the user 1 to play the game or during the play of the game or to end the game or a combination thereof. To illustrate, the user inputs 314 identify that a right joystick or a left joystick or a triangle button or a combination of two or more thereof of the HHC 104 is moved by the user 1. The user inputs 314 further identify an amount of operation of each control button of the HHC 104. To illustrate, the user inputs 314 identify that the left joystick of the HHC 104 is moved in the horizontal direction by the user 1 by an amount. Similarly, one or more control buttons of the client device 304, such as the HHC 204, are operated, such as moved or pressed or selected, by the user n to generate the user inputs 316 from the client device 304. As an example, the user inputs 316 generated from the client device 304 operated by the user n include signals indicating which of the control buttons are operated by the user n to play the game or during the play of the game or to end the game or a combination thereof. To illustrate, the user inputs 316 identify that a right joystick or a left joystick or a triangle button or a combination of two or more thereof of the HHC 204 is moved by the user n. The user inputs 316 further identify an amount of operation of each control button of the HHC 204. To illustrate, the user inputs 316 identify that the left joystick of the HHC 204 is moved in the vertical direction by the user 1 by an amount.

In one embodiment, the processor system 310 overrides one or more of the user inputs 314 with one or more of the user inputs 316. For example, upon determining that the request for assistance is received from the client device 302 via the computer network 306 and the acceptance of the request is received from the client device 304 via the computer network 306, the processor system 310 determines that one or more of the user inputs 314 and one or more of the user inputs 316 are directed towards the same game state, such as, defeating the virtual bird 108 (FIG. 1). To illustrate, the processor system 310 determines that one or more of the user inputs 314 are used to control the virtual character C1 to select the long sword to defeat the virtual bird 108 and one or more of the user inputs 316 are used to control the virtual character C1 to select the curved sword to defeat the virtual bird 108. Upon determining that the user inputs 316 are received from the client device 304 via the user account n, the processor system 310 determines to generate data for displaying the virtual character C1 as holding the curved sword instead of generating data for displaying the virtual character C1 as holding the long sword to override the one or more of the user inputs 314 with the one or more of the user inputs 316. In the illustration, the one or more of the user inputs 316 are received by the processor system 310 from the client device 304 within a predetermined time period of receipt of the one or more of the user inputs 314 from the client device 302. To further illustrate, one or more of the user inputs 316 are received by the processor system 310 from the client device 304 intermittently compared to the receipt of one or more of the user input 314 by the processor system 310 from the client device 302. Moreover, in the illustration, the processor system 310 generates and sends the data for displaying the virtual character C1 as holding the curved sword via the computer network 306 to the client device 302. Upon receiving the data for displaying the virtual character C1 as holding the curved sword, the processor of the client device 202 displays, on the display device 102, the virtual character C1 as holding the curved sword. In the illustration, both the long sword and the curved sword are directed towards the same predetermined goal, such as the game state, of defeating the virtual bird 108.

As another illustration, the processor system 310 determines that one or more of the user inputs 314 are used to control the virtual character C1 to move the curved sword in a horizontal direction and one or more of the user inputs 316 are used to control the virtual character C1 to move the curved sword in the vertical direction. Upon determining that the user inputs 316 are received from the client device 304 via the user account n, the processor system 310 determines to generate data for displaying the virtual character C1 as moving the curved sword in the vertical direction instead of generating data for displaying the virtual character C1 as moving the curved sword in the horizontal direction to override the one or more of the user inputs 314 with the one or more of the user inputs 316. In the illustration, the one or more of the user inputs 316 are received by the processor system 310 from the client device 304 within a predetermined time period of receipt of the one or more of the user inputs 314 from the client device 302. To further illustrate, one or more of the user inputs 316 are received by the processor system 310 from the client device 304 intermittently compared to the receipt of one or more of the user input 314 by the processor system 310 from the client device 302. Moreover, in the illustration, the processor system 310 generates and sends the data for displaying the virtual character C1 as moving the curved sword in the vertical direction via the computer network 306 to the client device 302. Upon receiving the data for displaying the virtual character C1 as moving the curved sword in the vertical direction, the processor of the client device 302 displays, on the display device 102, the virtual character C1 as moving the curved sword in the vertical direction. In the illustration, the movement of the curved sword in the horizontal direction or the vertical direction is directed towards the same game state of defeating the virtual bird 108.

In an embodiment, the functions described herein as being performed by the server system 308 are performed, such as executed, by the processor system 310.

FIG. 4 is a diagram of an embodiment of a system 400 to illustrate a method for training an AI model 402 to determine a manner in which the user n operates a controller, such as the hand-held controller 204 (FIG. 2A), to generate user input data 404. The system 400 includes game data 406, which includes user input data 408 and game context data 410. The game context data 410 is an example of game state data. The game data 406 is stored within the memory device system 312 (FIG. 3).

The system 400 further includes a data parser 412, an input data extractor and classifier 414, a game context data extractor and classifier 418, and the AI model 402. As an example, each of the data parser 412, the input data extractor and classifier 414, the game context data extractor and classifier 418, and the AI model 402 is implemented as a controller, such as an ASIC or a PLD. To illustrate, the data parser 412 is the first PLD and the input data extractor and classifier 414 is a second PLD. As another example, each of the data parser 412, the input data extractor and classifier 414, the game context data extractor and classifier 418, and the AI model 402 is a computer program or a portion of a computer program. To illustrate, the data parser 412 is a first computer program and the input data extractor and classifier 414 is a second computer program. As another illustration, the data parser 412 is a first portion of a computer program and the input data extractor and classifier 414 is a second portion of the computer program. As yet another illustration, each of the data parser 412, the input data extractor and classifier 414, the game context data extractor and classifier 418, and the AI model 402 is executed by the processor system 310.

The data parser 412 is coupled to the memory device system 312, the input data extractor and classifier 414, and the game context data extractor and classifier 418. The input data extractor and classifier 414 is coupled to the AI model 402. Similarly, the context data extractor 418 is coupled to the AI model 402.

The game context data 410 includes data regarding contexts of virtual scenes that are displayed on client devices, such as the client device operated by the user 1 or the client device operated by the user n. For example, the game context data 410 identifies virtual objects, such as the virtual character C1, the curved sword, the knife, types of movement of the curved sword, types of movement of the knife, and the virtual bird 108, and one or more virtual backgrounds in the virtual scene 203 (FIG. 2A) accessed via the user account n. To illustrate, the game context data 410 indicates that the virtual character C1, accessed via the user account n, wields the curved sword and the knife during a play of the game via the user account n. As another illustration, the game context data 410 indicates that the virtual character C1, accessed via the user account n, moves the curved sword in the vertical direction during a play of the game.

The user input data 408 is generated based on signals received from the client device operated by the user n. For example, the user input data 408 indicates that the user n operates one or more control buttons on the HHC 204 and/or display buttons on the display device 202 to control the virtual character C1, via the user account n, to wield the curved sword and the knife and further controls the virtual character C1 to move the curved sword in the vertical direction. To illustrate, the user input data 408 indicates that the user n selects a triangle button on the HHC 204 and selects a display button on the display device 202 to select the curved sword and the knife. Moreover, in the illustration, the user input data 408 indicates that the user n moves a left joystick of the HHC 204 in the vertical direction to move the curved sword in the vertical direction.

The data parser 412 accesses the game data 406 from the memory device system 312 and parses the game data 406 to distinguish between the user input data 408 and the game context data 410 for each user account 1 and n. For example, the data parser 412 differentiates the user input data 408 from the game context data 410 for the user account n based on file formats. To illustrate, the user input data 408 is stored in one or more files having a file format different from a file format of files in which the game context data 410 is stored.

The data parser 412 provides the user input data 408 to the input data extractor and classifier 414 and the game context data 410 to the context data extractor and classifier 418. The input data extractor and classifier 414, identifies for the user account n, classified input features 422, such as one or more control buttons and types of operation of the control buttons. For example, the input data extractor and classifier 414 determines from the user input data 408 received via the user account n that the triangle button is selected on the HHC 204 and the display button is selected on the display device 202 to wield the curved sword or the left joystick of the HHC 104 is moved in the vertical direction to move the curved sword in the vertical direction. To illustrate, the input data extractor and classifier 414 determines that the user input data 408 includes an identifier of the triangle button or another button of the HHC 204 to determine that the triangle button is selected by the user n. When the triangle button is selected, the HHC 204 generates the identifier of the triangle button and sends the identifier via the computer network 306 to the processor system 310. The processor system 310 stores the identifier in the memory device system 312. As another illustration, upon receiving the vertical movement of the left joystick of the HHC 204, one or more sensor devices, such as accelerometers, magnetometers, and gyroscopes, of the HHC 204 generates one or more signals, which are processed by a processor of the client device 304 to generate an identifier of the vertical movement of the left joystick. The processor of the client device 304 sends the identifier of the vertical movement via the computer network 306 to the processor system 310. The processor system 310 receives the identifier of the vertical movement and stores the identifier in the memory device system 312 and the identifier is accessed by the data parser 412 to provide to the input data extractor and classifier 414. The input data extractor and classifier 414 determines, from the identifier of the vertical movement, that the user input data 408 indicates the vertical movement of the left joystick.

For each user account n, the context data extractor and classifier 418 extracts, from the game context data 410, classified context features 424, such as a type of a virtual weapon, the virtual bird 108 (FIG. 2A), the virtual character C1, and a type of movement of the virtual weapon, corresponding to the classified input features 422 that are extracted by the input data extractor and classifier 414. For example, the context data extractor and classifier 418 determines, from the game context data 410, that the type of virtual weapon accessed in the virtual scene 203 (FIG. 2A) via the user account n is the curved sword. To illustrate, the processor system 310 stores an identifier of the type of virtual weapon accessed in the virtual scene 203 via the user account n in the memory device 312. In the illustration, the identifier includes a shape and dimensions of the curved sword. The identifier is accessed by the data parser 412 and sent to the context data extractor and classifier 418. The context data extractor and classifier 418 further identifies, from the game context data 410, that the curved sword is moved in the vertical direction. To illustrate, the processor system 310 stores an identifier of the type of movement of the curved sword in the virtual scene 203 within the memory device system 312. The identifier is accessed by the data parser 412 and sent to the context data extractor and classifier 418. The context data extractor and classifier 418 also identifies, from an identifier of the virtual bird 108, that the virtual bird 108 is displayed in the virtual scene 203 (FIG. 2A) and further identifies, from an identifier of the virtual character C1, that the virtual character C1 is displayed in the virtual scene 203.

The input data extractor and classifier 414 provides the classified input features 422 to the AI model 402 and the context data extractor and classifier 418 provides the classified context features 424 to the AI model 402. For example, the classified input features 422 and the classified context features 424 are provided to the AI model 402 within a predetermined time period to train the AI model 402. To illustrate, the classified input features 422 indicating that the user n selects the triangle button on the HHC 204 and further selects a display button on the display device 202 to select the curved sword and the knife is received within the predetermined time period, such as within a few seconds, from receiving the classified context features 424 indicating that the curved sword and the knife are displayed on the display device 202 and that the curved sword is displayed as being moved in the vertical direction on the display device 202. The AI model 402 is trained to associate, such as establish a mapping or a one-to-one relationship, the selections of the triangle button on the HHC 204 and the display button on the display device 202 (FIG. 2A) indicating the curved sword and the knife with the display of the curved sword and the knife and the vertical movement of the curved sword.

The AI model 402 is trained to determine a probability of generation of the user input data 404 that indicates a manner in which the HHC 204 is controlled to play of the game via the user account n. For example, based on the classified input features 422 and the classified context features 424, the AI model 402 determines that there is a high probability that during a next game session of the game, the user n will control the virtual character C1 to wield one or more types of virtual weapons, such as the curved sword and the knife, when interacting with the virtual bird 108 in the virtual scene 203 and moves the virtual weapon in a pre-learned direction, such as the vertical direction. In the example, the AI model 402 learns that user n operates the HHC 204 to access, from the game program, via the user account n, the curved sword and the knife for a majority of times, such as game sessions, for which the game is played and moves the curved sword in the vertical direction for the majority of times. The curved sword and the knife are accessed to defeat the virtual bird 108. In the example, during remaining times, such as remaining game sessions, the AI model 402 learns that the user n operates the HHC 204 to access another type of virtual weapon, such as the long sword or a guillotine or a hammer, or to move the virtual weapon in a direction other than the vertical direction, such as in the horizontal direction or an oblique direction, or a combination thereof. Upon learning that the user n operates the HHC 204 to access the curved sword and the knife for the majority of times and moves the curved sword in the vertical direction for the majority of times, the AI model 402 determines that the probability is high that the user n will, during the next game session, operate the HHC 204 to access the curved sword and the knife and move the curved sword in the vertical direction. The operation of the HHC 204 to access the curved sword and the knife and move the curved sword in the vertical direction is an example of the manner in which the HHC 204 is controlled by the user n to play of the game via the user account n, and therefore, is an example of the user input data 404.

In one embodiment, the AI model 402 is trained based on a play of the game. For example, the AI model 402 is not trained according to a manner of gameplay by the user n. Rather, the AI model 402 is trained to play the game to achieve the predetermined goal. To illustrate, the AI model 402 is trained to achieve one or more game states to achieve the predetermined goal.

In an embodiment, the AI model 402 is trained based on the play of the game and according to the manner of gameplay by the user n.

FIG. 5A is a diagram of an embodiment of a method 500 to illustrate switching between providing assistance by the AI model 402 (FIG. 4) and by the user n to the user 1 during a play of the game. When the provision of the assistance switches between the AI model 402 and the user n, intermittent assistance is provided to the user 1 via the user account 1. The method 500 is executed by the processor system 310 (FIG. 3). The method 500 includes an operation 502 of determining whether the user n is offline or online. For example, the processor system 310 determines whether the user n is logged into the user account n. Upon determining that the user n is not logged into the user account n, the processor system 310 determines that the user n is offline. On the other hand, in response to determining that the user n is logged into the user account n, the processor system 310 determines that the user n is online. The processor system 310 whether the user n is offline or online in response to receiving the request for assistance from the user account 1 and the request for assistance is made to the user account n.

Upon determining that the user n is offline, the processor system 310 sends a request to the AI model 402 to provide assistance to the user 1. For example, the processor system 310 executes the AI model 402 to provide the assistance. To illustrate, the processor system 310 sends the request for assistance upon determining that the request is made from the user account 1 to the user account n or that the interactive skills of gameplay by the user 1 fall below the predetermined threshold level or a combination thereof. As another example, the game program executed by the processor system 310 generates and sends the request for assistance to the AI model 402. Upon receiving the request for assistance from the processor system 310, the AI model 402 assists, in an operation 504 of the method 500, the user 1 to defeat the virtual bird 108. When the AI model 402 is trained based on the classified input features 422 and the classified context features 424 (FIG. 4) and the request to provide assistance to the user 1 is received from the game program, the AI model 402 provides the user input data 404 to the game program. The user input data 404 is provided to the game program to assist the user 1 in defeating the virtual bird 108. When the user input data 404 is received from the AI model 402, the game program executed by the processor system 310 generates data for displaying the overlay 252 (FIG. 2B) and controlling the overlay 252 based on the user input data 404. To illustrate, the data for displaying the overlay 252 includes ghost image data of the virtual character C1 holding the curved sword and the knife and moving the curved sword in the vertical direction. The data for displaying the overlay 252 is generated based on the manner in which the user n plays the game. The data for displaying the overlay 252 is sent from the processor system 310 via the computer network 306 to the client device 302 (FIG. 3) operated by the user 1. The GPU of the display device 102 receives the data for displaying the overlay 252 and displays the overlay 252 as illustrated in FIG. 2B.

During a time period in which the operation 504 is performed, the processor system 310 determines, in an operation 506 of the method 500, whether the user n is now online. For example, it is determined whether a network friend, such as a social network friend or a game network friend, of the user 1 is online. As another example, it is determined whether a first network friend of the user 1 is online and upon determining that the first network friend is not online, it is determined whether a second network friend of the user 1 is online.

Upon determining that the user n has now come online, the processor system 310, in an operation 508 of the method 500, allows the user n to assist the user 1. For example, the game program stops generating the data for displaying the virtual character C1 or the overlay 252 based on the user input data 404 output from the AI model 402. Rather, the game program waits for a user input from the client device 304 (FIG. 3) operated by the user n for controlling the virtual character C1 to defeat the virtual bird 108.

FIG. 5B is a diagram of an embodiment of a method 550 to illustrate that the AI model 402 (FIG. 4) assists the user 1 when the user n is incapable of assisting the user 1. The method 550 is executed by the processor system 310 (FIG. 3). The method 550 includes an operation 552 of determining whether the user n is assisting the user 1 in response to the request for assistance received from the user account 1. For example, the processor system 310 determines that the user inputs 316 (FIG. 3) are received in response to the request for assistance from the client device 302 (FIG. 3) to determine the user n is assisting the user 1. Upon determining that the user n is assisting the user 1, the processor system 310 determines whether a level of the assistance received from the user account n exceeds a predetermined threshold. For example, the processor system 310 determines whether, based on the user inputs 316, the virtual character C1 is able to achieve the predetermined goal, such as defeat the virtual bird 108 (FIG. 2B). Upon determining that the virtual character C1 is able to achieve the predetermined goal, the processor system 310 determines that the level of assistance exceeds the predetermined threshold. On the other hand, in response to determining that the virtual character C1 is unable to achieve the predetermined goal, the processor system 310 determines that the level of assistance does not exceed the predetermined threshold.

Upon determining that the level of assistance does not exceed the predetermined threshold, in the operation 504 of the method 550, the processor system 310 determines to apply, such as execute, the AI model 402 (FIG. 4) to assist the user 1 to achieve the predetermined threshold. For example, the game program executed by the processor system 310 generates and sends the request to the AI model 402. Upon receiving the request from the processor system 310, the AI model 402 assists the user 1 to achieve the predetermined goal in the same manner as that described above in the operation 504 (FIG. 5A). Once the predetermined goal is achieved, the operation 508 of the method 550 is performed.

FIG. 6 illustrates components of an example device 600, such as a client device or a server system, described herein, that can be used to perform aspects of the various embodiments of the present disclosure. This block diagram illustrates the device 600 that can incorporate or can be a personal computer, a smart phone, a video game console, a personal digital assistant, a server or other digital device, suitable for practicing an embodiment of the disclosure. The device 600 includes a CPU 602 for running software applications and optionally an operating system. The CPU 602 includes one or more homogeneous or heterogeneous processing cores. For example, the CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 600 can be a localized to a player, such as a user, described herein, playing a game segment (e.g., game console), or remote from the player (e.g., back-end server processor), or one of many servers using virtualization in a game cloud system for remote streaming of gameplay to clients.

A memory 604 stores applications and data for use by the CPU 602. A storage 606 provides non-volatile storage and other computer readable media for applications and data and may include fixed disk drives, removable disk drives, flash memory devices, compact disc-read only memory (CD-ROM), digital versatile disc-ROM (DVD-ROM), Blu-ray, high definition-digital versatile disc (HD-DVD), or other optical storage devices, as well as signal transmission and storage media. User input devices 608 communicate user inputs from one or more users to the device 600. Examples of the user input devices 608 include keyboards, mouse, joysticks, touch pads, touch screens, still or video recorders/cameras, tracking devices for recognizing gestures, and/or microphones. A network interface 614, such as a NIC, allows the device 600 to communicate with other computer systems via an electronic communications network, and may include wired or wireless communication over local area networks and wide area networks, such as the internet. An audio processor 612 is adapted to generate analog or digital audio output from instructions and/or data provided by the CPU 602, the memory 604, and/or data storage 606. The components of device 600, including the CPU 602, the memory 604, the data storage 606, the user input devices 608, the network interface 614, and an audio processor 612 are connected via a data bus 622.

A graphics subsystem 620 is further connected with the data bus 622 and the components of the device 600. The graphics subsystem 620 includes a graphics processing unit (GPU) 616 and a graphics memory 618. The graphics memory 618 includes a display memory (e.g., a frame buffer) used for storing pixel data for each pixel of an output image. The graphics memory 618 can be integrated in the same device as the GPU 616, connected as a separate device with the GPU 616, and/or implemented within the memory 604. Pixel data can be provided to the graphics memory 618 directly from the CPU 602. Alternatively, the CPU 602 provides the GPU 616 with data and/or instructions defining the desired output images, from which the GPU 616 generates the pixel data of one or more output images. The data and/or instructions defining the desired output images can be stored in the memory 604 and/or the graphics memory 618. In an embodiment, the GPU 616 includes three-dimensional (3D) rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from the graphics memory 618 to be displayed on the display device 610. The display device 610 can be any device capable of displaying visual information in response to a signal from the device 600, including a cathode ray tube (CRT) display, a liquid crystal display (LCD), a plasma display, and an organic light emitting diode (OLED) display. The device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:

monitoring gameplay of a user of a game, wherein the gameplay is monitored to identify interactive skills of gameplay by the user during a session of the game;

responsive to receiving a request for assistance from a device used by the user, determining that the interactive skills of gameplay have fallen below a threshold level for progressing the game to a predetermined goal;

initiating gameplay assistance responsive to the interactive skills falling below the threshold level for progressing the game to the predetermined goal, the gameplay assistance includes a blended bifurcation of inputs to complete one or more interactive tasks of the game, wherein the blended bifurcation of inputs includes an amount of assistance inputs that override selected ones of user inputs; and varying the amount of the assistance inputs over time during the gameplay, the varying comprising:

determining a user input parameter based on the user inputs received within a predetermined time period after the request for assistance;

determining the user input parameter exceeds the threshold level for progressing the game; and reducing the amount of the assistance inputs that override the selected ones of the user inputs; and wherein the gameplay assistance further includes:

identifying a first control button on the device used by the user that is to be operated by the assistance inputs;

providing instructions to illuminate the first control button in a first color; and providing instructions to illuminate a second control button on the device in a second color, the second control button being operated by the user.

2. The method of claim 1, wherein the interactive skills of gameplay include a level of the gameplay.

3. The method of claim 1, wherein the threshold level for progressing the game to the predetermined goal is a level for achieving a task during the session or a predetermined number of virtual points during the session or a combination thereof.

4. The method of claim 1, wherein the gameplay assistance further includes:

providing a hint of an interactive skill of gameplay using at least a haptic indicator; and responsive to providing the hint, determining that the interactive skills of gameplay remain below the threshold level for progressing the game to the predetermined goal, wherein the blended bifurcation of inputs is to complete the one or more interactive tasks of the game is provided responsive to providing the hint and determining that the interactive skills of gameplay remain below the threshold level for progressing the game to the predetermined goal.

5. The method of claim 1, further comprising:

processing, by a trained artificial intelligence (AI) model, the user inputs to identify classified input features, the classified input features comprising one or more control buttons and respective types of operation of the one or more control buttons;

processing, by the trained AI model, game context data to identify classified context features;

determining, by the trained AI model, using the one or more control buttons and the respective types of operation of the one or more control buttons and the classified context features, the selected ones of the user inputs to override; and generating, by the trained AI model, the assistance inputs that override the selected ones of the user inputs.

6. The method of claim 1, wherein the user is a first user, wherein the assistance inputs are received from a second user having access to the session of the game.

7. The method of claim 1, wherein when said initiating the gameplay assistance begins, an interactive cue is provided to the user to notify that the gameplay assistance is being provided via the blended bifurcation of inputs.

8. The method of claim 7, further comprising enabling a cancel of the gameplay assistance by the user, responsive to the interactive cue being provided to the user.

9. The method of claim 1, wherein the gameplay assistance further includes:

identifying a third control button on the device used by the user that is to be operated by the assistance inputs; and actuating the third control button on the device, the actuating occurring with the assistance inputs that override selected user inputs.

10. A system for providing gameplay assistance, comprising:

a processor configured to:

monitor gameplay of a user of a game to identify interactive skills of gameplay by the user during a session of the game;

responsive to receiving a request for assistance from a device used by the user, determine that the interactive skills of gameplay have fallen below a threshold level for progressing the game to a predetermined goal;

initiate gameplay assistance responsive to the interactive skills falling below the threshold level for progressing the game to the predetermined goal, the gameplay assistance includes a blended bifurcation of inputs to complete one or more interactive tasks of the game, wherein the blended bifurcation of inputs includes an amount of assistance inputs that override selected ones of user inputs; and varying the amount of the assistance inputs over time during the gameplay, the varying comprising:

determining a user input parameter based on the user inputs received within a predetermined time period after the request for assistance;

determining the user input parameter exceeds the threshold level for progressing the game; and reducing the amount of assistance inputs that override the selected ones of the user inputs; and wherein the gameplay assistance further includes:

identifying a first control button on the device used by the user that is to be operated by the assistance inputs;

providing instructions to illuminate the first control button in a first color; and providing instructions to illuminate a second control button on the device in a second color, the second control button being operated by the user; and a memory device coupled to the processor.

11. The system of claim 10, wherein the interactive skills of gameplay include a level of the gameplay.

12. The system of claim 10, wherein the threshold level for progressing the game to the predetermined goal is a level for achieving a task during the session or a predetermined number of virtual points during the session or a combination thereof.

13. The system of claim 10, wherein the gameplay assistance further includes:

providing a hint of an interactive skill of gameplay using at least a haptic indicator; and responsive to providing the hint, determining that the interactive skills of gameplay remain below the threshold level for progressing the game to the predetermined goal, wherein the blended bifurcation of inputs is to complete the one or more interactive tasks of the game is provided responsive to providing the hint and determining that the interactive skills of gameplay remain below the threshold level for progressing the game to the predetermined goal.

14. The system of claim 10, wherein when the blended bifurcation of inputs is provided, generating an indicator indicating a provision of the blended bifurcation of inputs.

15. The system of claim 10, wherein to vary the amount of assistance inputs, the processor is configured to override input controls of the device used by the user.

16. The system of claim 10, further comprising:

processing, by a trained artificial intelligence (AI) model, the user inputs to identify classified input features, the classified input features comprising one or more control buttons and respective types of operation of the one or more control buttons;

processing, by the trained AI model, game context data to identify classified context features;

determining, by the trained AI model, using the one or more control buttons and the respective types of operation of the one or more control buttons and the classified context features, the selected ones of the user inputs to override; and generating, by the trained AI model, the assistance inputs that override the selected ones of the user inputs.

17. The system of claim 10, wherein the user is a first user, wherein the assistance inputs are received from a second user having access to the session of the game.

18. A computer readable medium containing program instructions for providing gameplay assistance, wherein execution of the program instructions by one or more processors of a computer system causes the one or more processors to carry out operations of:

monitoring gameplay of a user of a game, wherein the gameplay is monitored to identify interactive skills of gameplay by the user during a session of the game;

responsive to receiving a request for assistance from a device used by the user, determining that the interactive skills of gameplay have fallen below a threshold level for progressing the game to a predetermined goal;

initiating gameplay assistance responsive to the interactive skills falling below the threshold level for progressing the game to the predetermined goal, the gameplay assistance includes a blended bifurcation of inputs to complete one or more interactive tasks of the game, wherein the blended bifurcation of inputs includes an amount of assistance inputs that override selected ones of user inputs; and varying the amount of the assistance inputs over time during the gameplay, the varying comprising:

determining a user input parameter based on the user inputs received within a predetermined time period after the request for assistance;

determining the user input parameter exceeds the threshold level for progressing the game; and reducing the amount of assistance inputs that override the selected ones of the user inputs; and wherein the gameplay assistance further includes:

identifying a first control button on the device used by the user that is to be operated by the assistance inputs;

providing instructions to illuminate the first control button in a first color; and providing instructions to illuminate a second control button on the device in a second color, the second control button being operated by the user.

19. The computer readable medium of claim 18, the program instructions further cause the one or more processors to carry out operations of:

processing, by a trained artificial intelligence (AI) model, the user inputs to identify classified input features, the classified input features comprising one or more control buttons and respective types of operation of the one or more control buttons;

processing, by the trained AI model, game context data to identify classified context features;

determining, by the trained AI model, using the one or more control buttons and the respective types of operation of the one or more control buttons and the classified context features, the selected ones of the user inputs to override; and generating, by the trained AI model, the assistance inputs that override the selected ones of the user inputs.

* * * * *